(12) United States Patent
Pal

(10) Patent No.: US 9,748,822 B2
(45) Date of Patent: Aug. 29, 2017

(54) COOLING FOR ELECTRICAL MACHINES

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 351 days.

(21) Appl. No.: 14/550,631

(22) Filed: Nov. 21, 2014

(65) Prior Publication Data

US 2016/0149472 A1 May 26, 2016

(51) Int. Cl.
H02K 9/22 (2006.01)
H02K 3/24 (2006.01)

(52) U.S. Cl.
CPC ........ *H02K 9/22* (2013.01); *H02K 3/24* (2013.01)

(58) Field of Classification Search
CPC .................................. H02K 3/24; H02K 9/22
USPC .......................................... 310/52, 54, 58, 64
See application file for complete search history.

(56) References Cited

U.S. PATENT DOCUMENTS

| 2,986,663 A * | 5/1961 | Ellis ........................ H02K 1/24 310/214 |
| 3,541,487 A | 11/1970 | Leonard |
| 8,198,762 B2 * | 6/2012 | Gagnon .................... H02K 3/24 310/54 |
| 8,723,378 B2 | 5/2014 | Daboussi et al. |
| 2009/0195092 A1 * | 8/2009 | Gagnon .................... H02K 3/24 310/54 |
| 2010/0026109 A1 * | 2/2010 | Hassett ............... F28D 15/0275 310/54 |
| 2013/0270936 A1 | 10/2013 | Mayor et al. |
| 2016/0149472 A1 * | 5/2016 | Pal ........................... H02K 9/22 310/64 |

FOREIGN PATENT DOCUMENTS

EP 2608366 A2 6/2013

OTHER PUBLICATIONS

END Winding Cooling in Electric Machines—Christopher Micallef, BEng (Hons)—Thesis submitted to the University of Nottingham for the degree of Doctor of Philosophy dated Sep. 2006.
European Search Report received from European Patent Office dated Jun. 16, 2016 for Application No. EP 15195854.
European Patent Office Official Examination Report dated Jun. 23, 2017 for Application No. 15195854.3.

* cited by examiner

*Primary Examiner* — John K Kim
(74) *Attorney, Agent, or Firm* — Locke Lord LLP; Scott D. Wofsy; Christopher J. Cillié

(57) ABSTRACT

A core for an electrical machine includes a core body, a winding, and a heat sink. The core body defines circumferentially offset winding slots. The winding is seated within the winding slots and has an endturn proximate the end of the core body. The heat sink is embedded in the winding endturn.

18 Claims, 5 Drawing Sheets

COOLING FOR ELECTRICAL MACHINES

BACKGROUND OF THE INVENTION

1. Field of the Invention

The present disclosure relates to electrical machines, and more particularly to cooling for electrical machine windings.

2. Description of Related Art

Electrical machines like motors, generators, and transformers typically include a rotor rotatable in relation to a stator. The rotor and/or the stator generally include windings. In motors and generators, the stator commonly carries the windings and the rotor carries magnets. Current flow through the stator windings generates a rotating magnetic field that interacts with a magnetic field generated by the magnets. The interaction causes the rotor to rotate, thereby converting electrical energy into mechanical energy. In generators, a prime mover typically supplies mechanical energy to the rotor. The mechanical energy rotates a magnetic field generated by the rotor magnets and induces current flow through the windings, thereby converting mechanical energy into electrical energy. In transformers, electrical energy input to either of a first set of windings rotatable in relation to a second set of windings induces an output current flow in the other of the first and second set of windings. This converts the frequency of the input electrical energy into output electrical energy having a different frequency. In some applications, current flow through the windings of the motor, generator, or transformer resistively generates heat. It can be necessary to dissipate the heat to the external environment.

Such conventional systems and methods of winding cooling have generally been considered satisfactory for their intended purpose. However, there is still a need in the art for improved winding cooling. The present disclosure provides a solution for this need.

SUMMARY OF THE INVENTION

A core for an electrical machine includes a core body, a winding, and a heat sink. The core body defines circumferentially offset winding slots. The winding is seated within the winding slots and has an endturn proximate the end of the core body. The heat sink is embedded in the winding endturn.

In certain embodiments the heat sink can include a platform, a plurality of fins extending from the platform in a first direction, and an anchor extending from the platform in a second direction, e.g. a direction opposite the first direction. It is contemplated that the heat sink can be formed from a thermally conductive material like aluminum or any other suitable material. The heat sink can have a thermally conductive body including the platform that can be formed using a stamping process, an extrusion process, or any other suitable fabrication process.

In accordance with certain embodiments, the plurality of fins can extend along a surface of the heat sink platform. The fins can define between one another a coolant flow channel. Opposing faces of adjacent fins and a portion of the platform separating the fins can bound the coolant flow channel. Coolant can traverse the coolant flow channel, removing heat from the heat sink for dissipation into the external environment. It is contemplated that the fins can span a portion of the platform, a width of the platform, or a length of the platform. The plurality of fins can be straight fins, pin fins, or any other suitable types of fins.

It is also contemplated that in accordance with certain embodiments the anchor can have a shank and a barb. The shank can be connected to the platform at one end, and can define the barb on an end opposite the platform. The winding can include a plurality of conductive wires and a resin. The resin can encapsulate a portion of the anchor, such as the barb, a portion of the shank, or the shank and the barb. The resin can also bond one or more of the conductive wires to the anchor.

A method of cooling an electrical machine includes conducting heat from the winding to a heat sink embedded in the winding. The method also includes convecting heat from the heat sink into a coolant fluid traversing the heat sink.

In certain embodiments, the method further can include conducting heat from the plurality of wire conductors, through the resin, and into the heat sink. The method can include directing the coolant fluid toward the heat sink platform. The method can also include flowing the coolant fluid radially across a surface of the heat sink. The coolant fluid can be directed toward the heat sink platform at an angle, such as a 90-degree or oblique angle.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
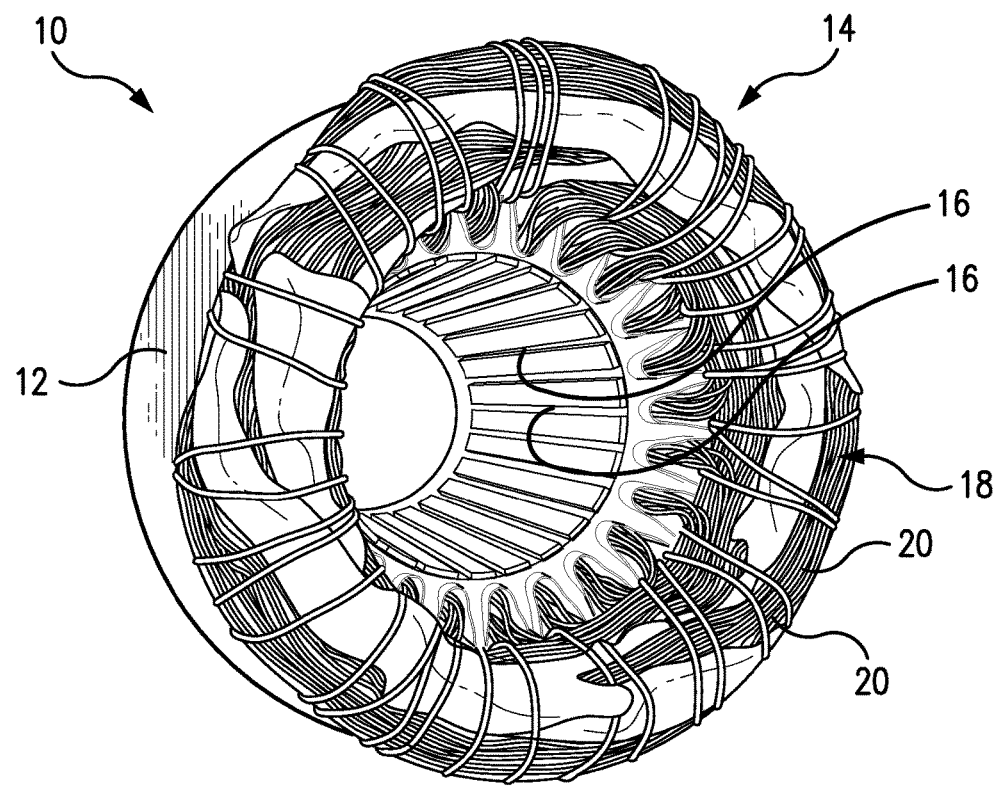
FIG. 1 is a perspective view of a core for an electrical machine, showing windings seated within winding slots defined within the core prior to installation of a heat sink.

Reference will now be made to the drawings wherein like reference numerals identify similar structural features or aspects of the subject disclosure. For purposes of explanation and illustration, and not limitation, a partial view of an exemplary embodiment of a core for an electrical machine in accordance with the disclosure is shown in FIG. 1 and is designated generally by reference character 100. Other embodiments of cores for electrical machines or aspects thereof, are provided in FIGS. 2-8, as will be described. The systems and methods described herein can be used electrical machines such as motors for aircraft air handling systems.

Figure 2:
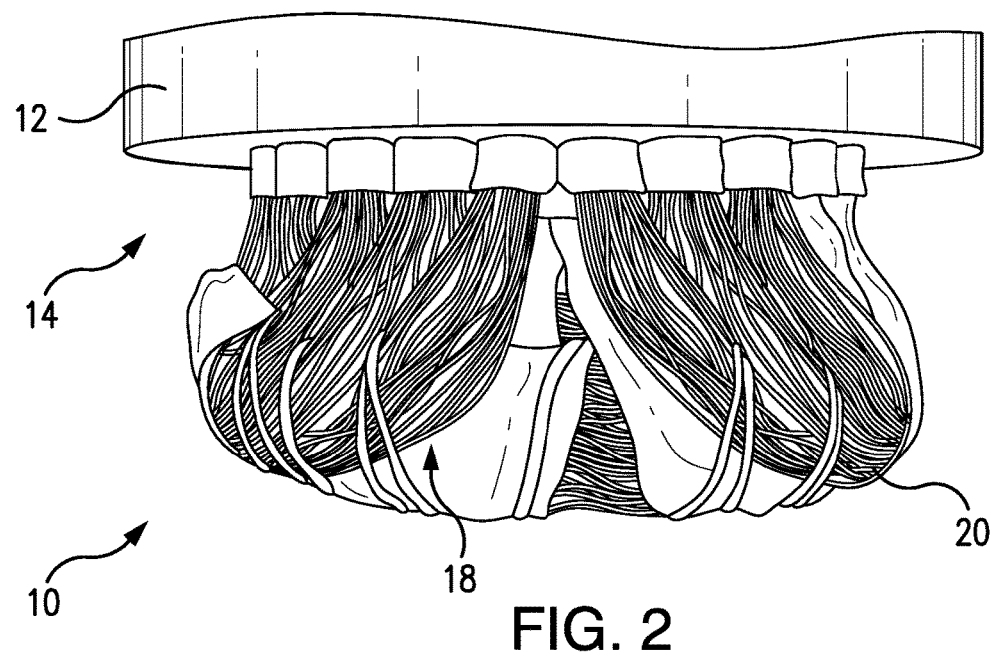
FIG. 2 is a perspective view of an end portion of the core of FIG. 1, showing conductive wires forming winding endturns proximate and end of the core prior to installation of a heat sink.

With reference to FIG. 1 and FIG. 2, a stator core 10 for an electrical machine is shown. Core 10 includes a core body 12 with an annular shape that is configured for receiving a centrally disposed rotor (not shown for clarity purposes). Core body 12 has an axial end 14 and defines within its interior a plurality of winding slots 16. Each of the plurality of winding slots extends axially along a length of core body 12 and is defined within an interior surface of core body 12. Windings 18 seat within winding slots 16, respective windings 18 having circumferentially adjacent axial lengths that seat within at least two of the plurality of winding slots 16. Windings 18 include a winding endturn 26 coupling the axial segments of the respective winding 18. As shown in FIG. 2, endturn 18 extends beyond core body 12 and disposed proximate to axial end 14 of core 10. Each of the plurality of windings 18 includes wires 20 that are formed from an electrically conductive material, such as copper or copper alloy for example.

Figure 3:
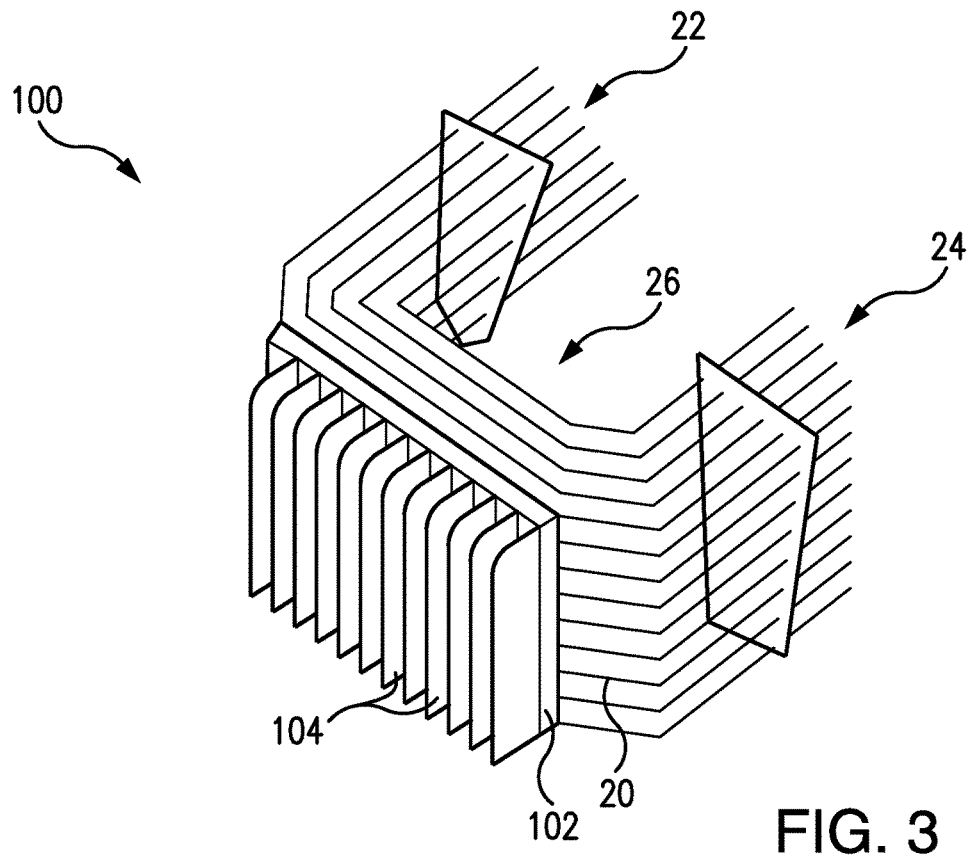
FIG. 3 is a schematic perspective view of a core constructed in accordance with the present disclosure, showing a straight fin heat sink embedded in a winding endturn.

With reference to FIG. 3, windings 18 and embedded heat sink 100 are shown. Windings 18 have a first axial segment 22, a second axial segment 24, and an endturn segment 26. Endturn segment 26 couples first axial segment 22 with second axial segment 24 and has embedded within it a heat sink 100. It is to be appreciated and understood that embedding heat sink 100 in winding endturn segment 26 allows for transferring heat generated from resistive heating of winding endturn 26 axially and in the direction of axial end 14 with respect to first axial segment 22 and second axial segment 24. It is also to be understood that heat sink 100 is fixed to endturn segment 26 by embedding a portion of heat sink 100 within endturn segment 26 such that heat sink 100 is in thermal communication with winding 18 through endturn segment 26.

Heat sink 100 includes a platform 102 and a plurality of fins 104. Platform 102 is adjacent to winding endturn segment 26 and is thermally communicative with winding 18 through winding endturn segment 26. The plurality of fins 104 are connected to platform 102 on one end and extend outwardly from platform 102 relative to platform 102 from a side of platform 102 opposite winding endturn segment 26. As illustrated in FIG. 3, fins 104 are straight fins that extend along substantially an entire length of platform 102. Fins 104 further define therebetween a coolant channel configured and adapted for directing coolant fluid along a surface of platform 102 and directing flow of coolant fluid across the surface of heat sink 100. In embodiments heat sink 100, is constructed from a thermally conductive material such as aluminum. In certain embodiments, heat sink 100 has a body with integral (as opposed to joined) platform and fins formed using an extrusion or stamping process.

Figure 4:
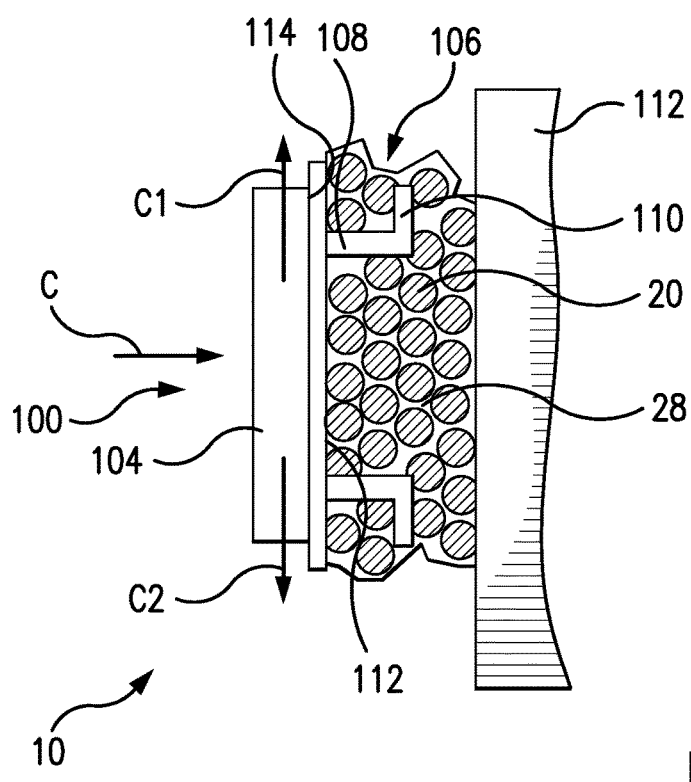
FIG. 4 is a schematic cross-section view of the core of FIG. 3, showing coolant fluid flow through the straight fins and embedded anchors fixing the heat sink to the winding endturn.

With reference to FIG. 4, stator core 10 with a core body 12, windings 18, and embedded heat sink 100 are shown. Heat sink 100 includes a plurality of anchors 106 embedded within winding 18. Anchors 106 extend from platform 102 on a side 112 of platform 102 opposite from fins 104 and include a respective shank portion 108 and barb portion 110. Shank portion 108 connects to platform 102 on a first end and defines barb portion 110 on second end opposite the first end. Barb portion 110 forms a lip-like structure configured and adapted for receiving individual wires 20 of winding 18. This facilitates coupling heat sink 100 with winding 18 by providing a surface for the winding to engage, i.e. bite, the anchor. It can also enhance heat transfer between winding 18 and heat sink 100. In embodiments, respective barb portions 110 face in opposite directions. Each barb can be oriented outward in relation to a center of heat sink 100, potentially improving the ability of anchors 106 to fix heat sink 100 within winding 18.

Winding 18 includes wires 20 and a resin 28. Resin 28 is electrically insulating and has relatively low thermal conductivity, i.e. lower than that of either or both of winding 18 (which can include copper) and heat sink 100 (which can include aluminum). Resin 28 also encapsulates wires 20 and at least barb portion 110 of anchors 106. In embodiments, resin 28 occupies substantially all the voids between adjacent wires between core body 12 and heat sink 100. This enhances heat transfer between winding 18 and heat sink 100 while providing sufficient electrical insulation between heat sink 100 and windings 18. It is contemplated that, during assembly, windings 18 are assembled into core 10, heat sink 100 is positioned within endturn segment 26, and the assembly is brought into contact with a supply of resin of suitably low viscosity such that resin 28 migrates to voids within endturn 26 assisted by capillary action. This enables 'filling' endturn segment 26 with sufficient resin such a substantially contiguous thermal conduit is defined between axial end 14 and heat sink 100 for conduction of heat from within winding 18 and into heat sink 100.

Fins 104 define a coolant fluid channel configured and adapted to direct coolant fluid flowing across a side 114 opposite winding endturn segment 126. This structure allows for spray cooling heat sink 100. For example, as illustrated in FIG. 4, a coolant fluid flow C can be sprayed toward side 114 and fins 104. The spray can be oriented at an oblique angle or a 90-degree angle. Upon contact with side 114, coolant fluid flow C splits into a first coolant flow $C_1$ and an oppositely directed second coolant flow $C_2$.

Figure 5:
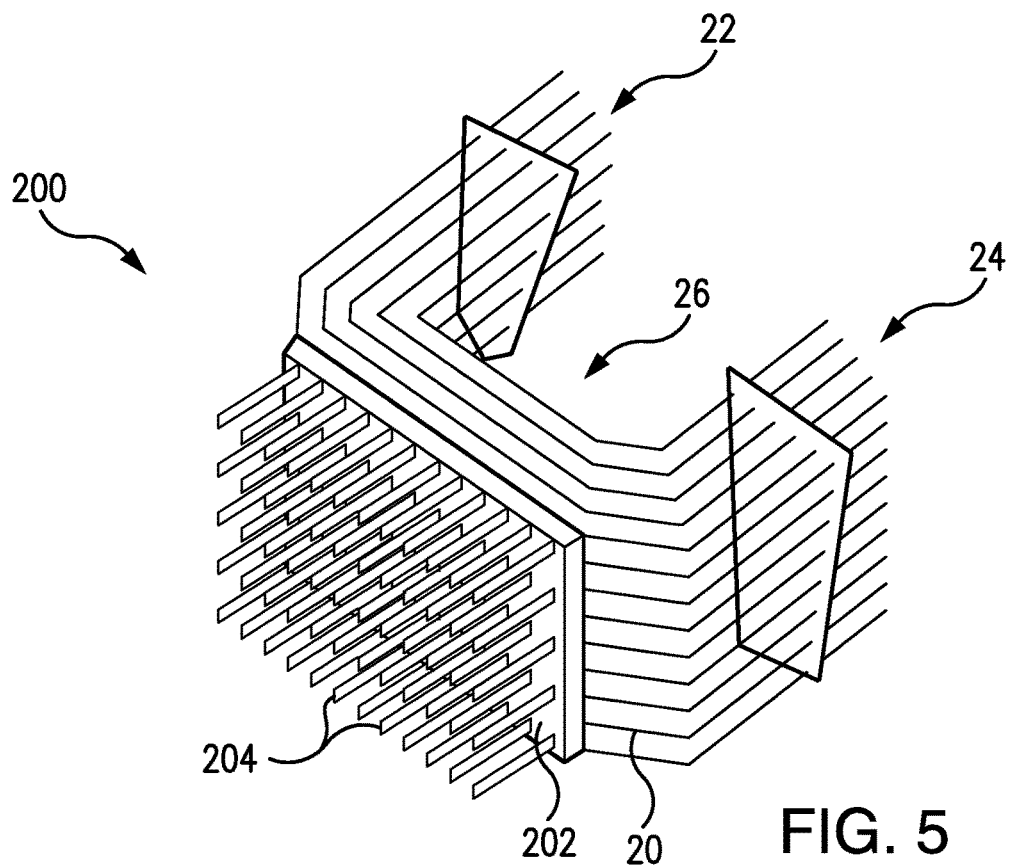
FIG. 5 is a schematic perspective view of another embodiment of a core, showing a pin fin heat sink embedded in a winding endturn.

With reference to FIG. 5, windings 18 and an embedded heat sink 200 are shown. Heat sink 200 is similar to heat sink 100 and includes a platform 202, pin fins 204, and anchors 206. Pin fins 204 form an interrupted coolant flow channel extending along platform 202. The interrupted coolant flow channels allow for coolant fluid to flow in a non-linear direction across heat sink 200. For example, in embodiments where heat sink 200 is moving in relation to a flow of coolant fluid gaps 212 defined between adjacent pin fins 204 allow for the coolant fluid to traverse an arcuate path across platform 202. This can increase the duration of time that the coolant fluid contacts heat sink 200, potentially increasing heat transfer from heat sink 200 and the coolant fluid.

Figure 6:
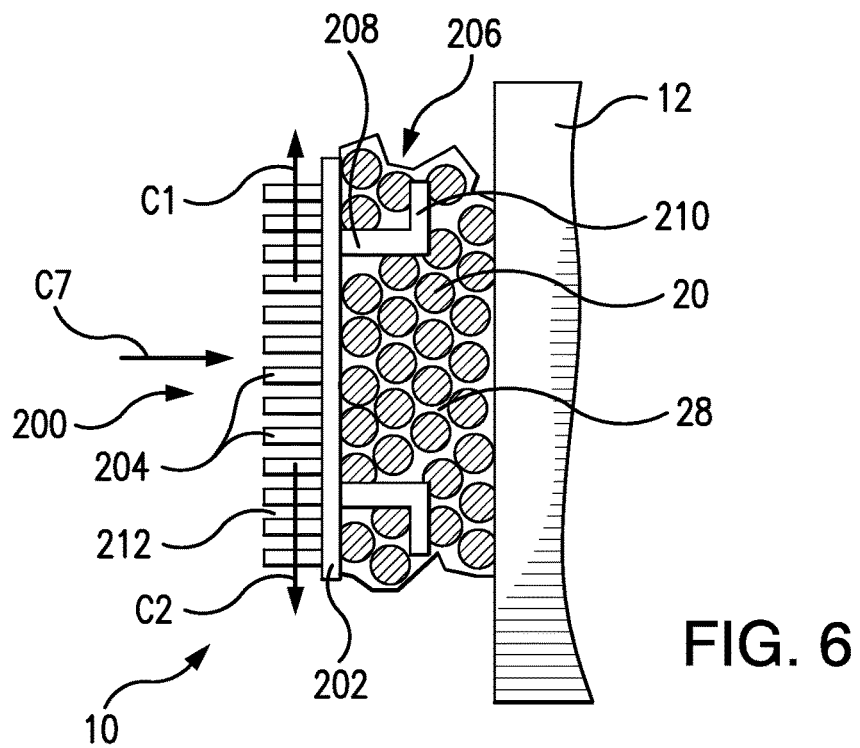
FIG. 6 is a schematic cross-section view of the core of FIG. 5, showing coolant fluid flow through the pin fins and embedded anchors fixing the heat sink to the winding endturn.

With reference to FIG. 6, stator core 10 with core body 12, windings 18, and embedded heat sink 200 are shown. Heat sink 200 includes a plurality of anchors 206 embedded within winding 18. Anchors 206 extend from platform 202 on a side of platform 202 opposite from pin fins 204 and include a respective shank portion 208 and barb portion 210. Shank portion 208 connects to platform 202 on a first end and defines barb portion 210 on second end opposite the first end. Barb portion 210 defines a lip-like structure configured and adapted for receiving individual wires 20 of winding 18. This facilitates coupling heat sink 200 with winding 18 by providing a surface for the winding to engage, i.e. bite, anchors 206. It can also enhance heat transfer between winding 18 and heat sink 200. In embodiments, respective barb portions 210 face in opposite directions. Each barb can be oriented outward in relation to a center of heat sink 200, potentially improving the ability of anchors 206 to fix heat sink 200 within winding 18.

Figure 7:
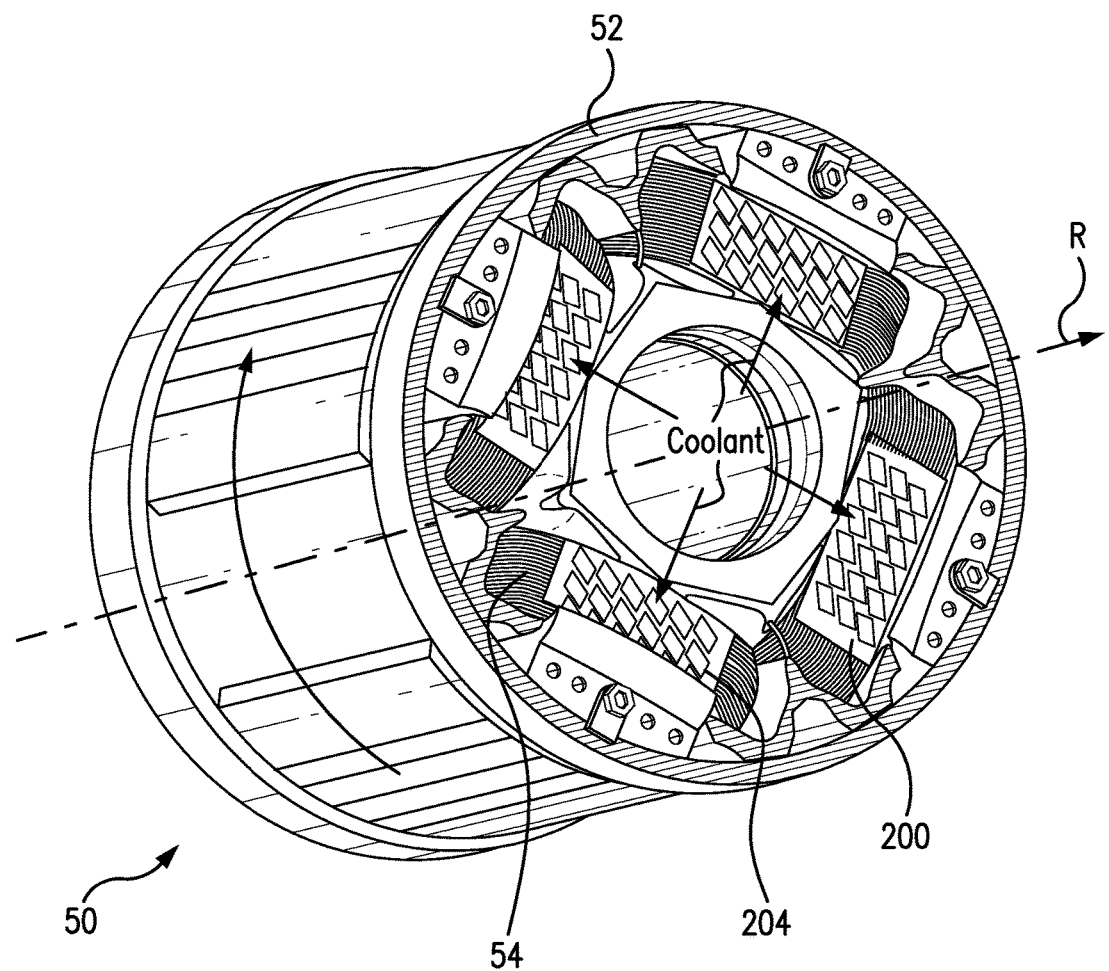
FIG. 7 is a perspective view of a rotor for an electrical machine, showing a heat sink cooled using a centrifugal coolant fluid flow.

With reference to FIG. 7, a rotor core 50 with a rotor core body 52, rotor windings 54, and embedded heat sinks 200 are shown. Rotor core 50 defines a central aperture 56 configured for receiving a rotor shaft (not shown for clarity reasons). Central aperture 56 is in fluid communication with a source of coolant fluid C. Rotor core 50 is configured for issuing coolant fluid C centrally from central aperture 56 such that coolant fluid C centrifugally traverses heat sink 200. Pin fins 204 as described above allow the coolant fluid C to traverse heat sink 200 in a radial direction with respect to a rotation axis of rotor core 50, the coolant fluid thereby following an arcuate path across heat sink 200 due to rotation of rotor core 50 and the centrifugal force associated with the rotation of rotor core 50.

Figure 8:
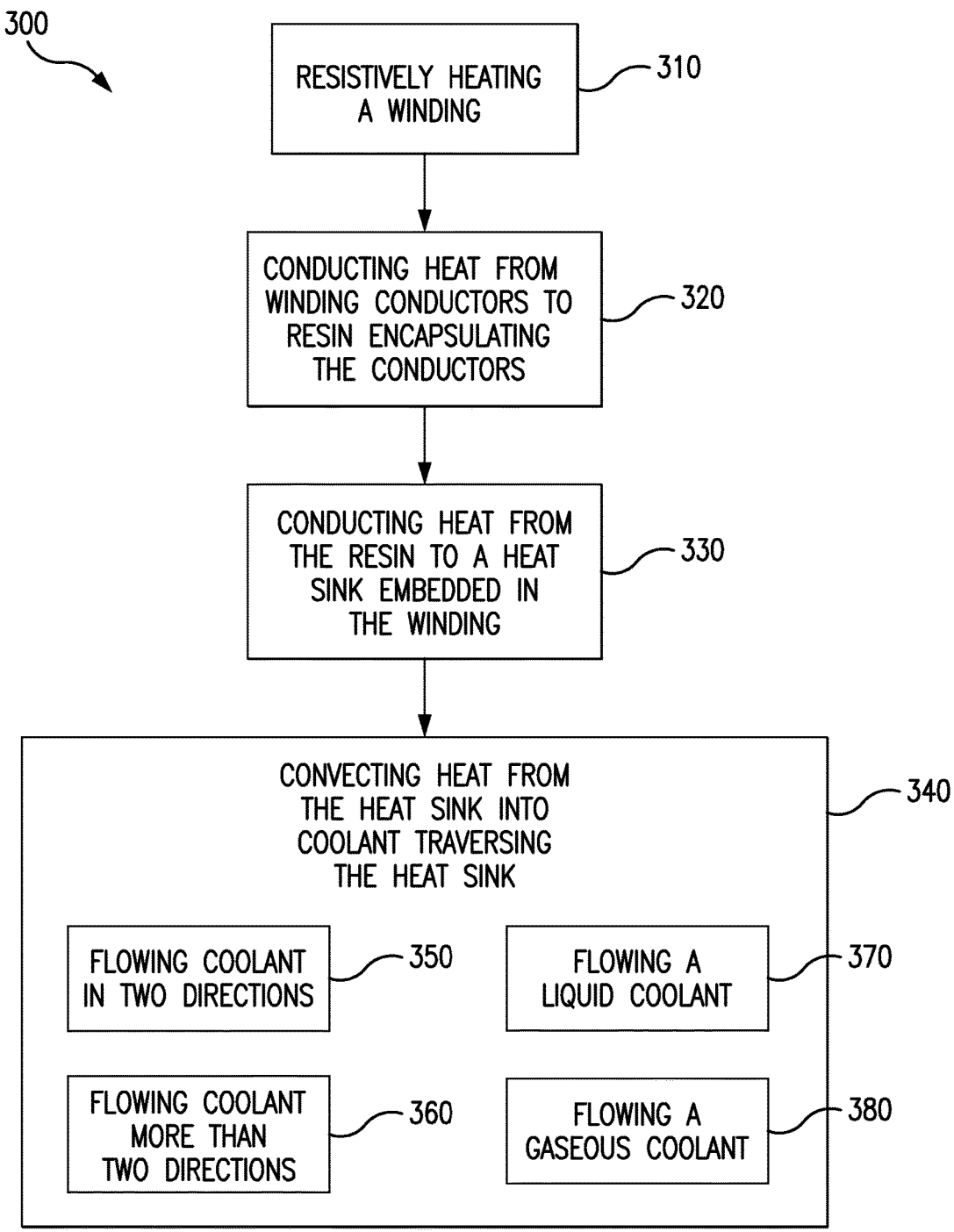
FIG. 8 is a flow chart of a method of cooling an electrical machine, showing operations of the method.

With reference to FIG. 8, a method 300 of cooling an electrical machine is shown. Method 300 includes resistively heating windings of an electrical machine, e.g. windings 18, as illustrated by a box 310. Method 300 also includes conducting heat from wires of the windings, e.g. wires 20, through a resin encapsulating the wire, e.g. resin 28, as also shown by a box 320. Method 300 further includes conducting heat from the resin into a heat sink embedded in the windings, e.g. heat sink 100 or heat sink 200, as illustrated by a box 330. Method 300 additionally includes convecting heat from the heat sink into coolant fluid traversing the heat sink, e.g. coolant fluid C, as further illustrated by a box 340. Convecting heat from the heat sink into the coolant fluid can include at least one of (a) flowing coolant fluid in two directions across the heat sink (as illustrated with a box 350), flowing coolant fluid in more than two directions across the heat sink platform (as illustrated with a box 360), flowing a liquid coolant fluid across the heat sink platform (as illustrated with a box 360), or flowing a gaseous coolant fluid across the heat sink platform (as illustrated with a box 370).

In embodiments, embedding heats sinks such as heat sink 100 (shown in FIG. 3) or heat sink 200 (shown in FIG. 5) can allow for the use of resin 28 without prohibitive increase in operation temperature. In certain embodiments, heat sink 100 (shown in FIG. 3) or heat sink 200 (shown in FIG. 5) allow for the use of resin 28 without any appreciable increase in operating temperature in electrical machines incorporating resin 28. Without being bound by a particular theory, it appears that structures such as anchors 106 (shown in FIG. 4) and anchors 206 (shown in FIG. 6) provide additional surface area within the interior of the winding endturns such that heat conduct more readily from the winding, offsetting the reduction in coolant that can accompany the use of resin 28. Heat transfer can be further improved by treating fins 104 (shown in FIG. 3) or pin fins 204 (shown in FIG. 5) with a mold release agent. This can prevent foreign material from collecting on the fins that could otherwise impair convection between coolant fluid traversing the heat sink and the heat sink.

The methods and systems of the present disclosure, as described above and shown in the drawings, provide for electric machines with superior properties including improved endturn winding cooling. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A core for an electrical machine, comprising:
a core body with circumferentially offset winding slots;
a winding seated in one or more of the winding slots and having an endturn proximate an end of the core body;
a heat sink embedded in the winding endturn, wherein heat sink includes an anchor fixed within the winding endturn, and wherein the anchor includes a shank having a having a barb defined on an end of the shank.

2. The core as recited in claim 1, wherein the heat sink includes a platform.

3. The core as recited in claim 1, wherein the winding includes a plurality of conductive wires and a resin, the resin encapsulating the conductive wires and the shank.

4. The core as recited in claim 3, wherein the resin electrically insulates the conductive wires and thermally couples the conductive wires to the heat sink.

5. The core as recited in claim 1, wherein the heat sink includes a first fin and a second fin.

6. The core as recited in claim 5, wherein the first fin and the second fin are straight fins.

7. The core as recited in claim 5, wherein the first fin and second the fin both include a plurality of pin fins.

8. The core as recited in claim 3, wherein the resin occupies substantially all voids between adjacent wires of the winding and the heat sink.

9. The core as recited in claim 3, wherein the resin has lower thermal conductivity than the winding.

10. The core as recited in claim 3, wherein the resin has lower thermal conductivity that the heat sink.

11. The core as recited in claim 3, wherein the resin has thermal conductivity that is lower than thermal conductivity of the winding and thermal conductivity of the heat sink.

12. The core as recited in claim 3, wherein the resin has lower thermal conductivity than copper.

13. A core for an electrical machine, comprising:
a core body with circumferentially offset winding slots;
a winding seated in one or more of the winding slots and having an endturn proximate an end of the core body; and
a heat sink embedded in the winding endturn, wherein the heat sink includes:
a platform having a first and second surface;
first and second fins extending from the first surface; and
an anchor extending from a second surface, wherein the anchor is fixed within the winding endturn.

14. A method of cooling an electrical machine, the method comprising:
conducting heat from a winding to a heat sink embedded in the winding,
wherein the winding is seated in a winding slot of a core body having circumferentially offset winding slots,
wherein the winding has an endturn proximate an end of the core body and the heat sink is embedded in the winding endturn,
wherein at least of the portion of the conducted heat flows through a barb defined on a shank of an anchor of the heat sink, the anchor being fixed within the winding endturn; and
convecting heat from the heat sink into a coolant fluid.

15. The method as recited in claim 14, further including conducting heat from the plurality of wire conductors through a resin and into the heat sink.

16. The method as recited in claim 14, wherein the heat sink has a platform and further including directing the coolant fluid at the heat sink platform.

17. The method as recited in claim 16, wherein the angle is about 90 degrees or is an oblique angle.

18. The method as recited in claim 16, further including flowing the coolant fluid radially across the heat sink platform.

* * * * *